(12) United States Patent
Johnke et al.

(10) Patent No.: US 9,939,196 B2
(45) Date of Patent: Apr. 10, 2018

(54) HYDROCARBON GAS PROCESSING INCLUDING A SINGLE EQUIPMENT ITEM PROCESSING ASSEMBLY

(75) Inventors: Andrew F. Johnke, Beresford, SD (US); W. Larry Lewis, Houston, TX (US); John D. Wilkinson, Midland, TX (US); Joe T. Lynch, Midland, TX (US); Hank M. Hudson, Midland, TX (US); Kyle T. Cuellar, Katy, TX (US)

(73) Assignees: Ortloff Engineers, Ltd., Midland, TX (US); S.M.E. Products LP, Houston, TX (US)

( * ) Notice: Subject to any disclaimer, the term of this patent is extended or adjusted under 35 U.S.C. 154(b) by 1218 days.

(21) Appl. No.: 12/792,136

(22) Filed: Jun. 2, 2010

(65) Prior Publication Data

US 2010/0326134 A1  Dec. 30, 2010

Related U.S. Application Data

(63) Continuation-in-part of application No. 12/781,259, filed on May 17, 2010, which is a continuation-in-part
(Continued)

(51) Int. Cl.
*F25J 3/02* (2006.01)

(52) U.S. Cl.
CPC .......... *F25J 3/0209* (2013.01); *F25J 3/0233* (2013.01); *F25J 3/0266* (2013.01); *F25J 3/0295* (2013.01); *F25J 2200/02* (2013.01); *F25J 2200/50* (2013.01); *F25J 2200/74* (2013.01); *F25J 2200/80* (2013.01); *F25J 2205/04* (2013.01); *F25J 2215/04* (2013.01);
(Continued)

(58) Field of Classification Search
CPC ......... F25J 3/0209; F25J 3/0233; F25J 3/2038
USPC ........................ 62/617, 618, 619, 620, 627
See application file for complete search history.

(56) References Cited

U.S. PATENT DOCUMENTS

| 33,408 A | 10/1861 | Turner et al. ................. 68/22 R |
| 3,292,380 A | 12/1966 | Bucklin ......................... 62/621 |

(Continued)

OTHER PUBLICATIONS

"Dew Point Control Gas Conditioning Units," SME Products Brochure, Gas Processors Assoc. Conference (Apr. 5, 2009).
(Continued)

*Primary Examiner* — John F Pettitt
(74) *Attorney, Agent, or Firm* — Fitzpatrick, Cella, Harper & Scinto (57) ABSTRACT

A process and an apparatus are disclosed for a compact processing assembly to remove carbon dioxide from a hydrocarbon gas stream. The gas stream is cooled, expanded to intermediate pressure, and fed to the top of a mass transfer means. A distillation liquid stream from the mass transfer means is heated in a first heat and mass transfer means to strip out its volatile components and form a bottom liquid product. A distillation vapor stream from the mass transfer means is combined with any vapor in the expanded cooled gas stream, and the combined vapor stream is cooled in a second heat and mass transfer means to partially condense it, forming a condensed stream that is fed to the top of the mass transfer means. A portion of the bottom liquid product is subcooled, expanded to lower pressure, and used to cool the combined vapor stream.

12 Claims, 4 Drawing Sheets

Related U.S. Application Data of application No. 12/772,472, filed on May 3, 2010, which is a continuation-in-part of application No. 12/750,862, filed on Mar. 31, 2010, now Pat. No. 8,881,549, which is a continuation-in-part of application No. 12/717,394, filed on Mar. 4, 2010, now Pat. No. 9,080,811, which is a continuation-in-part of application No. 12/689,616, filed on Jan. 19, 2010, now Pat. No. 9,021,831, which is a continuation-in-part of application No. 12/372,604, filed on Feb. 17, 2009, now abandoned.

(60) Provisional application No. 61/186,361, filed on Jun. 11, 2009.

(52) U.S. Cl.
CPC ........ *F25J 2235/80* (2013.01); *F25J 2240/02* (2013.01); *F25J 2240/40* (2013.01); *F25J 2260/20* (2013.01); *F25J 2260/80* (2013.01); *F25J 2270/02* (2013.01); *F25J 2270/90* (2013.01); *F25J 2290/40* (2013.01); *Y02C 10/12* (2013.01)

(56) References Cited

U.S. PATENT DOCUMENTS

| | | | |
|---|---|---|---|
| 3,477,915 A | 11/1969 | Grant et al. | |
| 3,508,412 A | 4/1970 | Yearout | |
| 3,516,261 A | 6/1970 | Hoffman | |
| 3,625,017 A | 12/1971 | Hoffman | |
| 3,797,261 A | 3/1974 | Juncker et al. | |
| 3,969,450 A * | 7/1976 | Hengstebeck | B01D 3/166 202/158 |
| 3,983,711 A | 10/1976 | Solomon | 62/630 |
| 4,061,481 A | 12/1977 | Campbell et al. | 62/621 |
| 4,127,009 A | 11/1978 | Phillips | |
| 4,140,504 A | 2/1979 | Campbell et al. | 62/621 |
| 4,157,904 A | 6/1979 | Campbell et al. | 62/623 |
| 4,171,964 A | 10/1979 | Campbell et al. | 62/621 |
| 4,185,978 A | 1/1980 | McGalliard et al. | 62/634 |
| 4,251,249 A | 2/1981 | Gulsby | 62/621 |
| 4,278,457 A | 7/1981 | Campbell et al. | 62/621 |
| 4,519,824 A | 5/1985 | Huebel | 62/621 |
| 4,617,039 A | 10/1986 | Buck | 62/621 |
| 4,687,499 A | 8/1987 | Aghili | 62/621 |
| 4,688,399 A | 8/1987 | Reimann | |
| 4,689,063 A | 8/1987 | Paradowski et al. | 62/621 |
| 4,690,702 A | 9/1987 | Paradowski et al. | 62/621 |
| 4,854,955 A | 8/1989 | Campbell et al. | 62/621 |
| 4,869,740 A | 9/1989 | Campbell et al. | 62/621 |
| 4,889,545 A | 12/1989 | Campbell et al. | 62/621 |
| 5,255,528 A | 10/1993 | Dao | |
| 5,275,005 A | 1/1994 | Campbell et al. | 62/621 |
| 5,282,507 A | 2/1994 | Tongu et al. | |
| 5,316,628 A | 5/1994 | Collin et al. | |
| 5,335,504 A | 8/1994 | Durr et al. | 62/632 |
| 5,339,654 A | 8/1994 | Cook et al. | |
| 5,367,884 A | 11/1994 | Phillips et al. | |
| 5,410,885 A | 5/1995 | Smolarek et al. | |
| 5,555,748 A | 9/1996 | Campbell et al. | 62/621 |
| 5,566,554 A | 10/1996 | Vijayaraghavan et al. | 62/621 |
| 5,568,737 A | 10/1996 | Campbell et al. | 62/621 |
| 5,675,054 A | 10/1997 | Manley et al. | |
| 5,685,170 A | 11/1997 | Sorensen | |
| 5,713,216 A | 2/1998 | Erickson | |
| 5,771,712 A | 6/1998 | Campbell et al. | 62/621 |
| 5,799,507 A | 9/1998 | Wilkinson et al. | 62/621 |
| 5,881,569 A | 3/1999 | Campbell et al. | 62/621 |
| 5,890,377 A | 4/1999 | Foglietta | |
| 5,890,378 A | 4/1999 | Rambo et al. | 62/621 |
| 5,942,164 A | 8/1999 | Tran | |
| 5,983,664 A | 11/1999 | Campbell et al. | 62/621 |
| 6,182,469 B1 | 2/2001 | Campbell et al. | 62/621 |
| 6,361,582 B1 | 3/2002 | Pinnau et al. | |
| 6,516,631 B1 | 2/2003 | Trebble | 62/630 |
| 6,565,626 B1 | 5/2003 | Baker et al. | |
| 6,578,379 B2 | 6/2003 | Paradowski | 62/622 |
| 6,694,775 B1 | 2/2004 | Higginbotham et al. | |
| 6,712,880 B2 | 3/2004 | Foglietta et al. | 95/184 |
| 6,915,662 B2 | 7/2005 | Wilkinson et al. | 62/621 |
| 7,165,423 B2 | 1/2007 | Winningham | 62/620 |
| 7,191,617 B2 | 3/2007 | Cuellar et al. | 62/628 |
| 7,210,311 B2 | 5/2007 | Wilkinson et al. | 62/611 |
| 7,219,513 B1 | 5/2007 | Mostafa | 62/620 |
| 2002/0166336 A1 | 11/2002 | Wilkinson et al. | |
| 2004/0079107 A1 | 4/2004 | Wilkinson et al. | |
| 2004/0172967 A1 | 9/2004 | Patel et al. | |
| 2005/0229634 A1 | 10/2005 | Huebel et al. | |
| 2005/0247078 A1 | 11/2005 | Wilkinson et al. | |
| 2005/0268649 A1 | 12/2005 | Wilkinson et al. | 62/613 |
| 2006/0032269 A1 | 2/2006 | Cuellar et al. | 62/620 |
| 2006/0086139 A1 | 4/2006 | Eaton et al. | |
| 2006/0283207 A1 | 12/2006 | Pitman et al. | 62/620 |
| 2008/0000265 A1 | 1/2008 | Cuellar et al. | 62/630 |
| 2008/0078205 A1 | 4/2008 | Cuellar et al. | 62/620 |
| 2008/0190136 A1 | 8/2008 | Pitman et al. | 62/620 |
| 2008/0271480 A1 | 11/2008 | Mak | 62/626 |
| 2009/0100862 A1 | 4/2009 | Wilkinson et al. | 62/620 |
| 2009/0107175 A1 | 4/2009 | Patel et al. | 62/620 |
| 2010/0236285 A1 | 9/2010 | Johnke et al. | 62/620 |
| 2010/0251764 A1 | 10/2010 | Johnke et al. | 62/620 |
| 2010/0275647 A1 | 11/2010 | Johnke et al. | 62/620 |
| 2010/0287983 A1 | 11/2010 | Johnke et al. | 62/620 |
| 2010/0287984 A1 | 11/2010 | Johnke et al. | 62/620 |
| 2010/0326134 A1 | 12/2010 | Johnke et al. | |
| 2011/0226011 A1 | 9/2011 | Johnke et al. | |
| 2011/0226012 A1 | 9/2011 | Johnke et al. | |
| 2011/0226013 A1 | 9/2011 | Johnke et al. | |
| 2011/0226014 A1 | 9/2011 | Johnke et al. | |
| 2011/0232328 A1 | 9/2011 | Johnke et al. | |

OTHER PUBLICATIONS

"Fuel Gas Conditioning Units for Compressor Engines," SME Products Brochure, Gas Processors Assoc. Conference (Apr. 5, 2009).

"P&ID Fuel Gas Conditioner," Drawing No. SMEP-901, Date Drawn: Aug. 29, 2007, SME, available at http://www.sme-lic.com/sme.cfm?a=prd&catID=58&subID=44&prdID=155 (Apr. 24, 2009).

"Fuel Gas Conditioner Preliminary Arrangement," Drawing No. SMP-1007-00, Date Drawn: Nov. 11, 2008, SME, available at http://www.sme-lic.com/sme.cfm?a=prd&catID=58&subID=44&prdID=155 (Apr. 24, 2009).

"Product: Fuel Gas Conditioning Units," SME Associates, LLC, available at http://www.sme-lic.com/sme.cfm?a=prd&catID=58&subID=44&prdID=155 (Apr. 24, 2009).

Mowrey, E. Ross., "Efficient, High Recovery of Liquids from Natural Gas Utilizing a High Pressure Absorber," Proceedings of the Eighty-First Annual Convention of the Gas Processors Association, Dallas, Texas, Mar. 11-13, 2002—10 pages.

International Search Report and Written Opinion issued in International Application No. PCT/US2011/028872 dated May 18, 2011—6 pages.

International Search Report and Written Opinion issued in International Application No. PCT/US2011/29234 dated May 20, 2011—29 pages.

International Search Report and Written Opinion issued in International Application No. PCT/US2011/029034 dated Jul. 27, 2011—39 pages.

International Search Report and Written Opinion issued in International Application No. PCT/US2011/029409 dated May 17, 2011—14 pages.

International Search Report and Written Opinion issued in International Application No. PCT/US2011/029239 dated May 20, 2011—20 pages.

Supplemental Notice of Allowability issued in U.S. Appl. No. 12/689,616, dated Feb. 10, 2015 (12 pages).

(56) References Cited

OTHER PUBLICATIONS

Comments on Statement of Reasons for Allowance filed in U.S. Appl. No. 12/689,616, dated Mar. 3, 2015 (7 pages).
Response and Statement of Interview filed in U.S. Appl. No. 13/052,575, dated Mar. 16, 2015 (37 pages).
Response and Statement of Interview filed in U.S. Appl. No. 13/052,348, dated Mar. 17, 2015 (37 pages).
Response and Statement of Interview filed in U.S. Appl. No. 13/053,792, dated Mar. 18, 2015 (37 pages).
Response, Statement of Interview and Petition for Extension of Time filed in U.S. Appl. No. 13/051,682, dated Mar. 19, 2015 (37 pages).
Response, Statement of Interview and Petition for Extension of Time filed in U.S. Appl. No. 13/048,315, dated Mar. 20, 2015 (93 pages).
Amendment and Statement of Interview filed in U.S. Appl. No. 13/052,348, dated Mar. 26, 2015 (23 pages).
Amendment and Statement of Interview filed in U.S. Appl. No. 13/051,682, dated Mar. 26, 2015 (29 pages).
Amendment and Statement of Interview filed in U.S. Appl. No. 13/053,792, dated Mar. 26, 2015 (25 pages).
Amendment and Statement of Interview filed in U.S. Appl. No. 13/052,575, dated Mar. 26, 2015 (20 pages).
Notice of Allowance and Fee(s) Due issued in U.S. Appl. No. 12/689,616, dated Jan. 9, 2015 (15 pages).
Comments on Statement of Reasons for Allowance filed in U.S. Appl. No. 12/689,616, dated Jan. 30, 2015 (8 pages).
Office Action issued in U.S. Appl. No. 13/052,348, dated Dec. 17, 2014 (13 pages).
Office Action issued in U.S. Appl. No. 13/051,682, dated Dec. 18, 2014 (13 pages).
Office Action issued in U.S. Appl. No. 13/053,792, dated Dec. 18, 2014 (20 pages).
Office Action issued in U.S. Appl. No. 13/052,575, dated Dec. 16, 2014 (16 pages).
Advisory Action Before the Filing of an Appeal Brief issued in U.S. Appl. No. 12/689,616, dated Nov. 28, 2014 (3 pages).
Submission Under 37 C.F.R. § 1.114, Statement of Interview, and Petition for Extension of Time filed in U.S. Appl. No. 12/689,616, dated Dec. 8, 2014 (39 pages).
Applicant-Initiated Interview Summary issued in U.S. Appl. No. 13/052,348, dated Feb. 20, 2015 (4 pages).
Applicant-Initiated Interview Summary issued in U.S. Appl. No. 13/053,792, dated Mar. 6, 2015 (4 pages).
Amendment, Statement of Interview and Petition for Extension of Time filed in U.S. Appl. No. 12/689,616, dated Nov. 6, 2014 (30 pages).

\* cited by examiner

HYDROCARBON GAS PROCESSING INCLUDING A SINGLE EQUIPMENT ITEM PROCESSING ASSEMBLY

This invention relates to a process and apparatus for the separation of a gas containing hydrocarbons and carbon dioxide. The applicants claim the benefits under Title 35, United States Code, Section 119(e) of prior U.S. Provisional Application No. 61/186,361 which was filed on Jun. 11, 2009. The applicants also claim the benefits under Title 35, United States Code, Section 120 as a continuation-in-part of U.S. patent application Ser. No. 12/781,259 which was filed on May 17, 2010, and as a continuation-in-part of U.S. patent application Ser. No. 12/772,472 which was filed on May 3, 2010, and as a continuation-in-part of U.S. patent application Ser. No. 12/750,862 which was filed on Mar. 31, 2010, and as a continuation-in-part of U.S. patent application Ser. No. 12/717,394 which was filed on Mar. 4, 2010, and as a continuation-in-part of U.S. patent application Ser. No. 12/689,616 which was filed on Jan. 19, 2010, and as a continuation-in-part of U.S. patent application Ser. No. 12/372,604 which was filed on Feb. 17, 2009. Assignees S.M.E. Products LP and Ortloff Engineers, Ltd. were parties to a joint research agreement that was in effect before the invention of this application was made.

BACKGROUND OF THE INVENTION

Hydrocarbons are found in a variety of gases, such as natural gas, refinery gas, and synthetic gas streams obtained from other hydrocarbon materials such as coal, crude oil, naphtha, oil shale, tar sands, and lignite. The hydrocarbon constituents of natural gas usually have a major proportion of methane and ethane, i.e., methane and ethane together comprise at least 50 mole percent of the total hydrocarbon components. The gas also usually contains relatively lesser amounts of heavier hydrocarbons such as propane, butanes, pentanes, and the like, as well as carbon dioxide, hydrogen, nitrogen, and other gases.

In many cases, the gas streams from these sources are contaminated with high concentrations of carbon dioxide, making the gas streams unsuitable for use as fuel, chemical plant feedstock, or other purposes. There are a variety of processes that have been developed to remove the carbon dioxide using chemical, physical, and hybrid solvents. Other processes have been developed that use a refrigerated absorbent stream composed of heavy ($C_4$-$C_{10}$ typically) hydrocarbons to remove the carbon dioxide in a distillation column, such as the process described in U.S. Pat. No. 4,318,723. All of these processes have increasingly higher capital cost and operating cost as the carbon dioxide concentration in the gas stream increases, which often makes processing of such gas streams uneconomical.

One method for improving the economics of processing gas streams containing high concentrations of carbon dioxide is to provide bulk separation of the carbon dioxide from the gas stream prior to processing with solvents or absorbents, so that only a minor fraction of the carbon dioxide must then be removed from the gas stream. For example, semi-permeable membranes have often been used for bulk removal of carbon dioxide. However, a significant fraction of the lighter hydrocarbons in the gas stream are often "lost" in the carbon dioxide stream that is separated by bulk removal processes of this type.

A better alternative for bulk removal of carbon dioxide is to use distillation to fractionate the gas stream into a light hydrocarbon stream and a carbon dioxide stream, so that removal of the residual carbon dioxide from the light hydrocarbon stream is all that is required to produce pipeline-quality gas for use as fuel, chemical plant feedstock, etc. The majority of the carbon dioxide that is removed is recovered as a liquid rather than a vapor, allowing the carbon dioxide to be pumped (rather than compressed) for subsequent use in tertiary oil recovery operations or for other purposes, resulting in substantial reductions in capital cost and operating cost.

The present invention is generally concerned with the removal of the majority of the carbon dioxide from such gas streams. A typical analysis of a gas stream to be processed in accordance with this invention would be, in approximate mole percent, 31.0% methane, 0.4% ethane and other $C_2$ components, 0.1% propane and other $C_3$ components, 0.1% butanes plus, and 67.7% carbon dioxide, with the balance made up of nitrogen. Sulfur containing gases are also sometimes present.

In a typical distillation process for removing carbon dioxide, a feed gas stream under pressure is cooled by heat exchange with other streams of the process and/or external sources of refrigeration such as a Freon compression-refrigeration system. The gas is condensed as it is cooled, and the high-pressure liquid is expanded to an intermediate pressure, resulting in further cooling of the stream due to the vaporization occurring during expansion of the liquids. The expanded stream, comprising a mixture of liquid and vapor, is fractionated in a distillation column to separate residual methane, nitrogen, and other volatile gases as overhead vapor from the carbon dioxide and the heavier hydrocarbon components as bottom liquid product. A portion of the liquid carbon dioxide can be flash expanded to lower pressure and thereafter used to provide low level refrigeration to the process streams if desired.

The present invention employs a novel means of performing the various steps described above more efficiently and using fewer pieces of equipment. This is accomplished by combining what heretofore have been individual equipment items into a common housing, thereby reducing the plot space required for the processing plant and reducing the capital cost of the facility. Surprisingly, applicants have found that the more compact arrangement also reduces the power consumption required to achieve a given level of carbon dioxide removal, thereby increasing the process efficiency and reducing the operating cost of the facility. In addition, the more compact arrangement also eliminates much of the piping used to interconnect the individual equipment items in traditional plant designs, further reducing capital cost and also eliminating the associated flanged piping connections. Since piping flanges are a potential leak source for carbon dioxide (a greenhouse gas) and for hydrocarbons (which are volatile organic compounds, VOCs, that contribute to greenhouse gases and may also be precursors to atmospheric ozone formation), eliminating these flanges reduces the potential for atmospheric emissions that can damage the environment.

In accordance with the present invention, it has been found that more than 87% of the carbon dioxide can be removed while leaving more than 99% of the methane in the residue gas stream. The present invention, although applicable at lower pressures and warmer temperatures, is particularly advantageous when processing feed gases in the range of 400 to 1500 psia [2,758 to 10,342 kPa(a)] or higher under conditions requiring distillation column overhead temperatures of −50° F. [−46° C.] or colder.

For a better understanding of the present invention, reference is made to the following examples and drawings. Referring to the drawings.

In the following explanation of the above figures, tables are provided summarizing flow rates calculated for representative process conditions. In the tables appearing herein, the values for flow rates (in moles per hour) have been rounded to the nearest whole number for convenience. The total stream rates shown in the tables include all non-hydrocarbon components and hence are generally larger than the sum of the stream flow rates for the hydrocarbon components. Temperatures indicated are approximate values rounded to the nearest degree. It should also be noted that the process design calculations performed for the purpose of comparing the processes depicted in the figures are based on the assumption of no heat leak from (or to) the surroundings to (or from) the process. The quality of commercially available insulating materials makes this a very reasonable assumption and one that is typically made by those skilled in the art.

For convenience, process parameters are reported in both the traditional British units and in the units of the Système International d'Unités (SI). The molar flow rates given in the tables may be interpreted as either pound moles per hour or kilogram moles per hour. The energy consumptions reported as horsepower (HP) and/or thousand British Thermal Units per hour (MBTU/Hr) correspond to the stated molar flow rates in pound moles per hour. The energy consumptions reported as kilowatts (kW) correspond to the stated molar flow rates in kilogram moles per hour.

DESCRIPTION OF THE PRIOR ART

Figure 1:
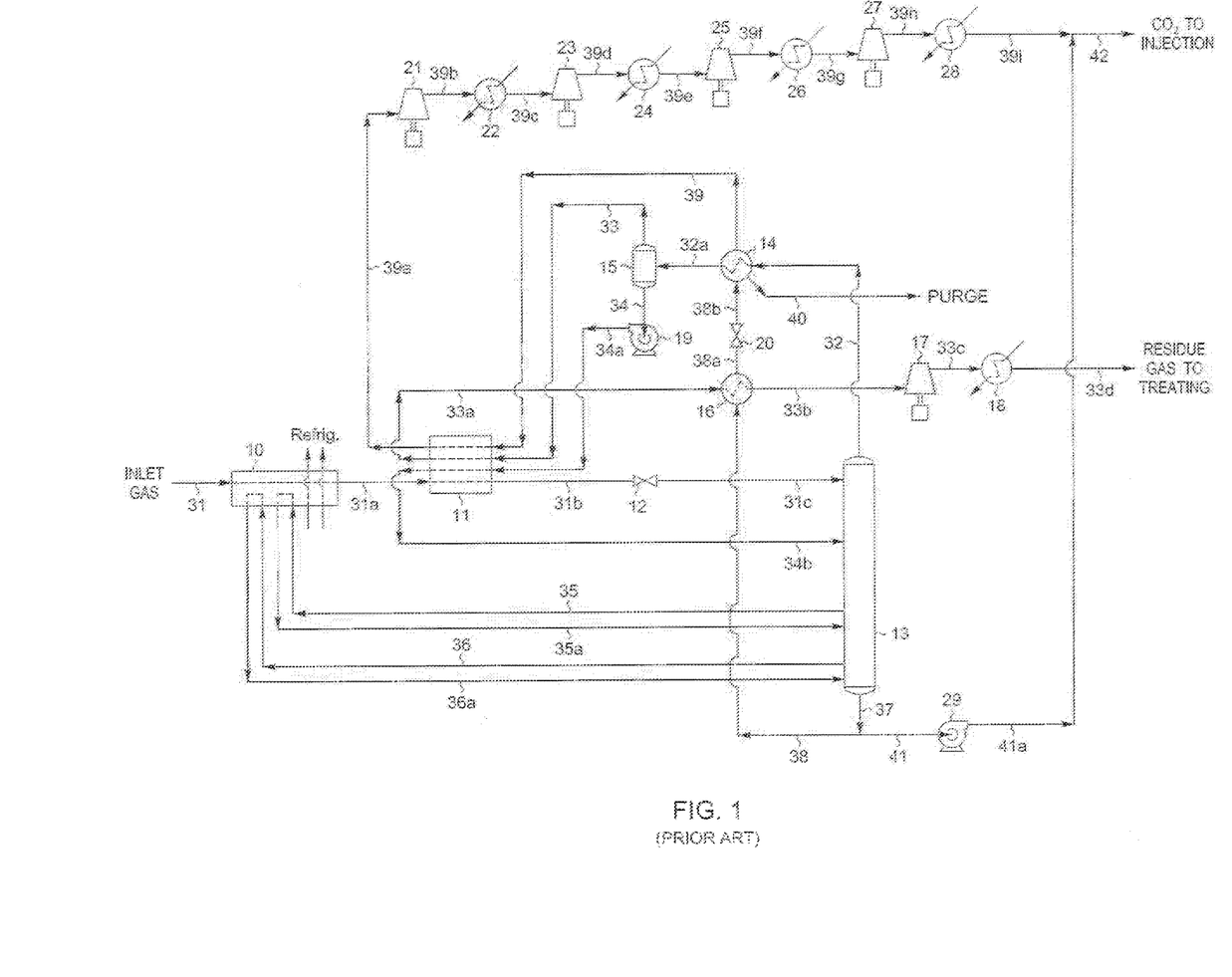
FIG. 1 is a flow diagram of a prior art natural gas processing plant.

FIG. 1 is a process flow diagram showing the design of a processing plant to remove carbon dioxide from natural gas using a prior art process. In this simulation of the process, inlet gas enters the plant at 81° F. [27° C.] and 1110 psia [7,653 kPa(a)] as stream 31. The feed stream is usually dehydrated to prevent hydrate (ice) formation under cryogenic conditions. Solid and liquid desiccants have both been used for this purpose.

The feed stream 31 is cooled to 1° F. [−17° C.] in heat exchanger 10 by heat exchange with column reboiler liquids at 43° F. [6° C.] (stream 36), column side reboiler liquids at 30° F. [−1° C.] (stream 35), and Freon R134a refrigerant. Stream 31a is further cooled in heat exchanger 11 by heat exchange with cool carbon dioxide vapor at −49° F. [−45° C.] (stream 39), cold residue gas at −60° F. [−51° C.] (stream 33), and pumped liquid at −60° F. [−51° C.] (stream 34a). The further cooled stream 31b at −14° F. [−25° C.] and 1060 psia [7,308 kPa(a)] is expanded to the operating pressure (approximately 617 psia [4,254 kPa(a)]) of fractionation tower 13 by expansion valve 12, cooling stream 31c to −35° F. [−37° C.] before it is supplied to fractionation tower 13 at its top column feed point.

Overhead vapor stream 32 leaves fractionation tower 13 at −35° F. [−37° C.] and is cooled and partially condensed in heat exchanger 14. The partially condensed stream 32a enters separator 15 at −60° F. [−51° C.] and 610 psia [4,206 kPa(a)] where the vapor (cold residue gas stream 33) is separated from the condensed liquid (stream 34). Liquid stream 34 is pumped to slightly above the operating pressure of fractionation tower 13 by pump 19 before stream 34a enters heat exchanger 11 and is heated to −6° F. [−21° C.] and partially vaporized by heat exchange with the feed gas as described previously. The partially vaporized stream 34b is thereafter supplied as feed to fractionation tower 13 at a mid-column feed point.

Fractionation tower 13 is a conventional distillation column containing a plurality of vertically spaced trays, one or more packed beds, or some combination of trays and packing. It also includes reboilers (such as the reboiler and the side reboiler described previously) which heat and vaporize a portion of the liquids flowing down the column to provide the stripping vapors which flow up the column to strip the column bottom liquid product (stream 37) of methane and lighter components. The trays and/or packing provide the necessary contact between the stripping vapors rising upward and cold liquid falling downward, so that the bottom product stream 37 exits the bottom of the tower at 45° F. [7° C.], based on reducing the methane concentration in the bottom product to 0.50% on a molar basis.

Column bottom product stream 37 is predominantly liquid carbon dioxide. A small portion (stream 38) is subcooled in heat exchanger 16 by cool residue gas stream 33a. The subcooled liquid (stream 38a) at 0° F. [−18° C.] is expanded to lower pressure by expansion valve 20 and partially vaporized, further cooling stream 38b to −63° F. [−53° C.] before it enters heat exchanger 14. The residual liquid in stream 38b functions as refrigerant in heat exchanger 14 to provide cooling of stream 32 as described previously, with the resulting carbon dioxide vapor leaving at −49° F. [−45° C.] as stream 39. Since stream 38b contains a small amount of heavier hydrocarbons, a small liquid purge (stream 40) is drawn off from heat exchanger 14 to prevent an accumulation of heavier hydrocarbons in the refrigerant liquid that could elevate its boiling point and reduce the cooling efficiency of heat exchanger 14.

The cool carbon dioxide vapor from heat exchanger 14 (stream 39) is heated to −6° F. [−21° C.] in heat exchanger 11 by heat exchange with the feed gas as described previously. The warm carbon dioxide vapor (stream 39a) at 76 psia [524 kPa(a)] is then compressed to high pressure in four stages by compressors 21, 23, 25, and 27, with cooling to 120° F. [49° C.] after each stage of compression by discharge coolers 22, 24, 26, and 28. The remaining portion (stream 41) of column bottom product stream 37 is pumped to high pressure by pump 29 so that stream 41a can combine with the dense phase fluid (stream 39i) leaving discharge cooler 28, forming high pressure carbon dioxide stream 42 which then flows to reinjection at 79° F. [26° C.] and 2015 psia [13,893 kPa(a)].

The cool residue gas (stream 33a) leaves heat exchanger 11 at −6° F. [−21 ° C.] after heat exchange with the feed gas as described previously, and is further heated to 27° F. [−3° C.] in heat exchanger 16 by heat exchange with liquid carbon dioxide stream 38 as described previously. The warm residue gas stream 33b is then re-compressed by compressor 17 and cooled to 120° F. [49° C.] in discharge cooler 18 before it flows to treating at 1215 psia [8,377 kPa(a)].

A summary of stream flow rates and energy consumption for the process illustrated in FIG. 1 is set forth in the following table:

TABLE I (FIG. 1)
Stream Flow Summary - Lb. Moles/Hr [kg moles/Hr]

| Stream | Methane | Ethane | Propane | Butanes+ | C. Dioxide | Total |
|---|---|---|---|---|---|---|
| 31 | 14,993 | 176 | 61 | 70 | 32,714 | 48,306 |
| 32 | 15,902 | 86 | 13 | 3 | 8,171 | 24,476 |
| 34 | 1,053 | 23 | 7 | 2 | 4,038 | 5,133 |
| 37 | 144 | 113 | 55 | 69 | 28,581 | 28,963 |
| 38 | 27 | 21 | 10 | 13 | 5,378 | 5,450 |
| 40 | 0 | 0 | 0 | 5 | 2 | 8 |
| 39 | 27 | 21 | 10 | 8 | 5,376 | 5,442 |
| 41 | 117 | 92 | 45 | 56 | 23,203 | 23,513 |
| 33 | 14,849 | 63 | 6 | 1 | 4,133 | 19,343 |
| 42 | 144 | 113 | 55 | 64 | 28,579 | 28,955 |

Recovery/Removal*

| | |
|---|---|
| Methane | 99.04% (recovered in the Residue Gas) |
| Carbon Dioxide | 87.37% (removed from the Residue Gas) |

Carbon Dioxide Concentrations*

| | |
|---|---|
| Residue Gas | 21.37% |
| Carbon Dioxide Product | 98.70% |

Power

| | | |
|---|---|---|
| Carbon Dioxide Compression | 9,344 HP | [15,361 kW] |
| Residue Gas Compression | 6,563 HP | [10,789 kW] |
| Refrigerant Compression | 10,319 HP | [16,964 kW] |
| Carbon Dioxide Pump | 2,563 HP | [4,214 kW] |
| Liquid Pump | 12 HP | [20 kW] |
| Totals | 28,801 HP | [47,348 kW] |

*(Based on un-rounded flow rates)

DESCRIPTION OF THE INVENTION

Figure 2:
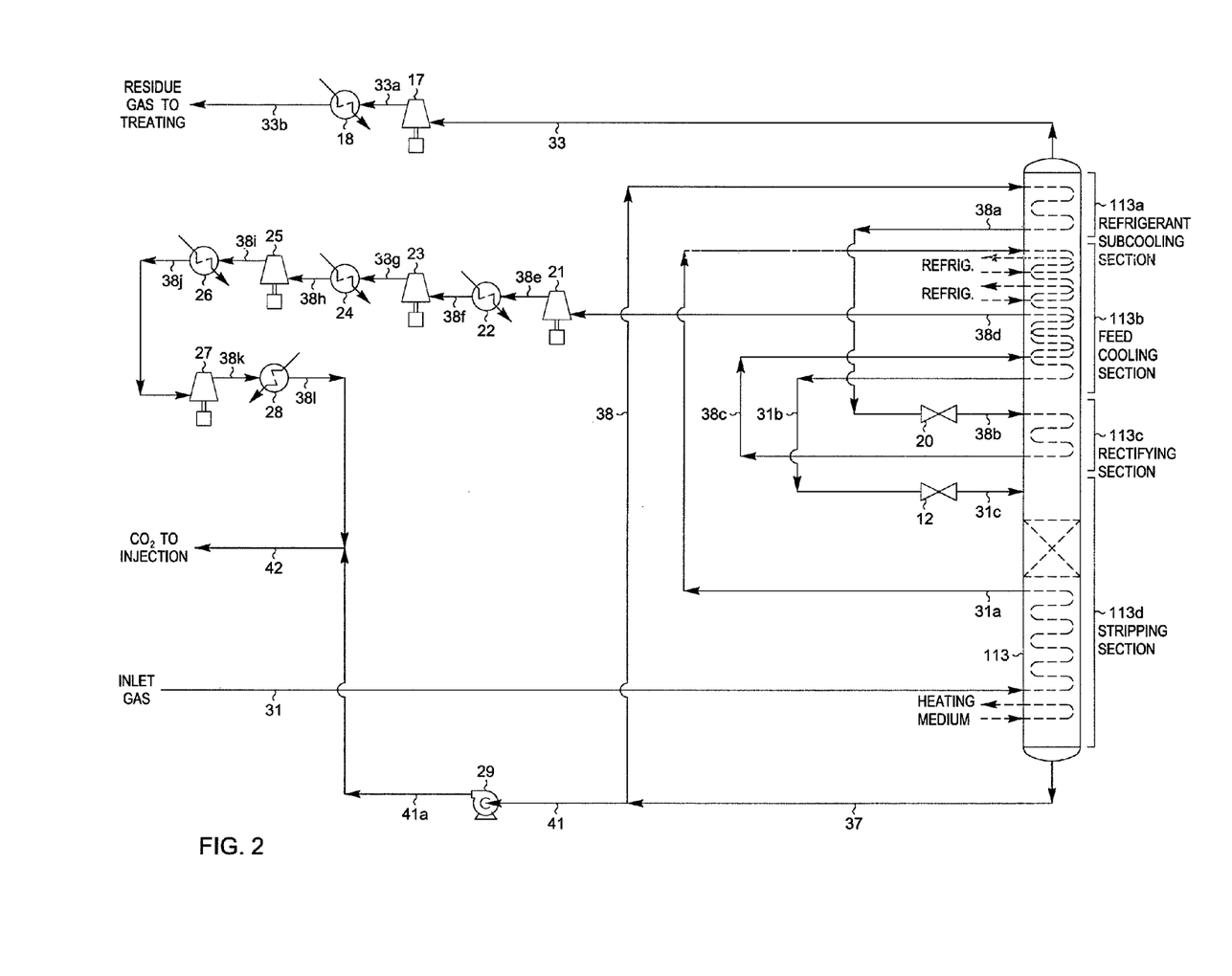
FIG. 2 is a flow diagram of a natural gas processing plant in accordance with the present invention.

FIG. 2 illustrates a flow diagram of a process in accordance with the present invention. The feed gas composition and conditions considered in the process presented in FIG. 2 are the same as those in FIG. 1. Accordingly, the FIG. 2 process can be compared with that of the FIG. 1 process to illustrate the advantages of the present invention.

In the simulation of the FIG. 2 process, inlet gas enters the plant at 81° F. [27° C.] and 1110 psia [7,653 kPa(a)] as stream 31 and enters a heat and mass transfer means in the lower region of stripping section 113d inside processing assembly 113. This heat and mass transfer means may be comprised of a fin and tube type heat exchanger, a plate type heat exchanger, a brazed aluminum type heat exchanger, or other type of heat transfer device, including multi-pass and/or multi-service heat exchangers. The heat and mass transfer means is configured to provide heat exchange between stream 31 flowing through one pass of the heat and mass transfer means and a distillation liquid stream flowing downward from a mass transfer means in the upper region of stripping section 113d inside processing assembly 113, so that stream 31 is cooled while heating the distillation liquid stream, cooling stream 31a to 34° F. [1° C.] before it leaves the heat and mass transfer means. As the distillation liquid stream is heated, a portion of it is vaporized to form stripping vapors that rise upward as the remaining liquid continues flowing downward through the heat and mass transfer means. The heat and mass transfer means provides continuous contact between the stripping vapors and the distillation liquid stream so that it also functions to provide mass transfer between the vapor and liquid phases, stripping the liquid product stream 37 of methane and lighter components.

The partially cooled stream 31a enters a heat exchange means in feed cooling section 113b inside processing assembly 113. This heat exchange means may also be comprised of a fin and tube type heat exchanger, a plate type heat exchanger, a brazed aluminum type heat exchanger, or other type of heat transfer device, including multi-pass and/or multi-service heat exchangers. The heat exchange means is configured to provide heat exchange between stream 31a flowing through one pass of the heat exchange means, Freon R134a refrigerant streams, a residue gas stream arising from rectifying section 113c inside processing assembly 113, and cool carbon dioxide stream 38c (which is described further below in paragraph [0028]). Stream 31a is further cooled while heating these other streams, whereupon the further cooled stream 31b at −14° F. [−25° C.] and 1076 psia [7,419 kPa(a)] is expanded to the operating pressure (approximately 618 psia [4,264 kPa(a)]) of stripping section 113d by expansion valve 12, cooling stream 31c to −35° F. [−37° C.] before it is supplied to processing assembly 113 above the mass transfer means in the upper region of stripping section 113d.

Stripping section 113d inside processing assembly 113 contains a mass transfer means consisting of a plurality of vertically spaced trays, one or more packed beds, or some combination of trays and packing. The trays and/or packing provide the necessary contact between the vapors rising upward and cold liquid falling downward. The liquid portion of expanded stream 31c commingles with liquids falling downward from rectifying section 113c and the combined liquid continues downward to the mass transfer means in the upper region of stripping section 113d. The stripping vapors arising from the heat and mass transfer means in the lower region of stripping section 113d rise upward through the mass transfer means in the upper region of stripping section 113d to partially strip the combined liquid of methane and lighter components, with the remaining stripping vapors leaving the mass transfer means and combining with the vapor portion of expanded stream 31c to form a distillation vapor stream that continues upward to rectifying section 113c. The partially stripped distillation liquid leaving the mass transfer means in the upper region of stripping section 113d continues downward into the heat and mass transfer means in the lower region of stripping section 113d to continue the stripping of methane and lighter components from the liquid. The resulting liquid product (stream 37) exits the lower region of stripping section 113d and leaves processing assembly 113 at 45° F. [7° C.], based on reducing the methane concentration in the bottom product to 0.50% on a molar basis.

Column bottom product stream 37 is predominantly liquid carbon dioxide. A small portion (stream 38) enters a heat exchange means in refrigerant subcooling section 113a inside processing assembly 113. This heat exchange means may likewise be comprised of a fin and tube type heat exchanger, a plate type heat exchanger, a brazed aluminum type heat exchanger, or other type of heat transfer device, including multi-pass and/or multi-service heat exchangers. The heat exchange means is configured to provide heat exchange between stream 38 flowing through one pass of the heat exchange means and the residue gas stream from rectifying section 113c inside processing assembly 113 that has been heated in the heat exchange means in feed cooling section 113b, so that stream 38 is subcooled while further heating the residue gas stream. The resulting subcooled liquid (stream 38a) at 0° F. [−18° C.] is expanded to lower pressure by expansion valve 20 and partially vaporized, further cooling stream 38b to −64° F. [−54° C.] before it enters a heat and mass transfer means in rectifying section 113c inside processing assembly 113. This heat and mass transfer means may likewise be comprised of a fin and tube type heat exchanger, a plate type heat exchanger, a brazed aluminum type heat exchanger, or other type of heat transfer device, including multi-pass and/or multi-service heat exchangers. The heat and mass transfer means is configured to provide heat exchange between the distillation vapor stream arising from stripping section 113d flowing upward through one pass of the heat and mass transfer means and the expanded stream 38b flowing downward, so that the distillation vapor is cooled while heating the expanded stream. As the distillation vapor stream is cooled, a portion of it is condensed and falls downward while the remaining distillation vapor continues flowing upward through the heat and mass transfer means. The heat and mass transfer means provides continuous contact between the condensed liquid and the distillation vapor so that it also functions to provide mass transfer between the vapor and liquid phases, thereby providing rectification of the distillation vapor. The condensed liquid is collected from the bottom of the heat and mass transfer means, combined with the liquid portion of expanded stream 31c, and directed to the mass transfer means in the upper region of stripping section 113d as described previously. The residual liquid in stream 38b functions as refrigerant in the heat and mass transfer means to provide the cooling and rectification of the distillation vapor stream, with the resulting mostly vaporized carbon dioxide leaving the heat and mass transfer means in rectifying section 113c at −48° F. [−44° C.] as stream 38c.

The cool carbon dioxide from the heat and mass transfer means in rectifying section 113c inside processing assembly 113 (stream 38c) is heated to −10° F. [−23° C.] in the heat exchange means in feed cooling section 113b inside processing assembly 113 by heat exchange with the feed gas as described previously. The warm carbon dioxide vapor (stream 38d) at 76 psia [527 kPa(a)] is then compressed to high pressure in four stages by compressors 21, 23, 25, and 27, with cooling to 120° F. [49° C.] after each stage of compression by discharge coolers 22, 24, 26, and 28. The remaining portion (stream 41) of column bottom product stream 37 is pumped to high pressure by pump 29 so that stream 41a can combine with the dense phase fluid (stream 38l) leaving discharge cooler 28, forming high pressure carbon dioxide stream 42 which then flows to reinjection at 78° F. [26° C.] and 2015 psia [13,893 kPa(a)].

The vapor arising from rectifying section 113c is the residue gas. It is warmed in feed cooling section 113b as it provides cooling to the feed gas as described previously. The residue gas stream is further heated in refrigerant subcooling section 113a as it provides cooling to stream 38 as described previously, whereupon residue gas stream 33 leaves processing assembly 113 at 20° F. [−7° C.]. The residue gas stream is then re-compressed by compressor 17 and cooled to 120° F. [49° C.] in discharge cooler 18 before it flows to treating at 1215 psia [8,377 kPa(a)].

A summary of stream flow rates and energy consumption for the process illustrated in FIG. 2 is set forth in the following table:

TABLE II (FIG. 2)
Stream Flow Summary - Lb. Moles/Hr [kg moles/Hr]

| Stream | Methane | Ethane | Propane | Butanes+ | C. Dioxide | Total |
|---|---|---|---|---|---|---|
| 31 | 14,993 | 176 | 61 | 70 | 32,714 | 48,306 |
| 37 | 144 | 109 | 55 | 70 | 28,580 | 28,959 |
| 38 | 24 | 19 | 9 | 12 | 4,887 | 4,951 |
| 41 | 120 | 90 | 46 | 58 | 23,693 | 24,008 |
| 33 | 14,849 | 67 | 6 | 0 | 4,134 | 19,347 |
| 42 | 144 | 109 | 55 | 70 | 28,580 | 28,959 |

Recovery/Removal*

| | |
|---|---|
| Methane | 99.03% (recovered in the Residue Gas) |
| Carbon Dioxide | 87.36% (removed from the Residue Gas) |

Carbon Dioxide Concentrations*

| | |
|---|---|
| Residue Gas | 21.37% |
| Carbon Dioxide Product | 98.69% |

Power

| | | |
|---|---|---|
| Carbon Dioxide Compression | 8,449 HP | [13,890 kW] |
| Residue Gas Compression | 6,119 HP | [10,060 kW] |
| Refrigerant Compression | 11,498 HP | [18,902 kW] |
| Carbon Dioxide Pump | 2,617 HP | [4,302 kW] |
| Totals | 28,683 HP | [47,154 kW] |

*(Based on un-rounded flow rates)

A comparison of Tables I and II shows that, compared to the prior art, the present invention maintains essentially the same methane recovery (99.03% versus 99.04% for the prior art), carbon dioxide removal (87.36% versus 87.37% for the prior art), carbon dioxide concentration in the residue gas (21.37% versus 21.37% for the prior art), and carbon dioxide purity (98.69% versus 98.70% for the prior art). However, further comparison of Tables I and II shows that the process performance was achieved using less power than the prior art. In terms of the total power consumption, the present invention represents a 0.4% improvement over the prior art of the FIG. 1 process.

The improvement in energy efficiency provided by the present invention over that of the prior art of the FIG. 1 process is primarily due to three factors. First, the compact arrangement of the heat exchange means in refrigerant subcooling section 113a and feed cooling section 113b inside processing assembly 113 eliminates the pressure drop imposed by the interconnecting piping found in conventional processing plants. The result is that the residue gas flowing to compressor 17 is at higher pressure for the present invention compared to the prior art, thereby reducing the power required by the present invention to restore the residue gas to the pressure needed for subsequent treating.

Second, using the heat and mass transfer means in the lower region of stripping section 113d to simultaneously heat the distillation liquid leaving the mass transfer means in the upper region of stripping section 113d while allowing the resulting vapors to contact the liquid and strip its volatile components is more efficient than using a conventional distillation column with external reboilers. The volatile components are stripped out of the liquid continuously, reducing the concentration of the volatile components in the stripping vapors more quickly and thereby improving the stripping efficiency for the present invention.

Third, using the heat and mass transfer means in rectifying section 113c to simultaneously cool the distillation vapor stream arising from stripping section 113d while condensing the carbon dioxide and the heavier hydrocarbon components from the distillation vapor stream provides more efficient rectification than using reflux in a conventional distillation column. As a result, less of the liquid carbon dioxide in bottom product stream 37 is needed to provide low level refrigeration to the process compared to the prior art of the FIG. 1 process. This allows more of the carbon dioxide to be pumped to high pressure rather than being compressed, reducing the power needed to deliver the carbon dioxide to reinjection (due to the inherent power advantage of pumping liquids compared to compressing gases).

The present invention offers two other advantages over the prior art in addition to the increase in processing efficiency. First, the compact arrangement of processing assembly 113 of the present invention replaces seven separate equipment items in the prior art (heat exchangers 10, 11, 14, and 16, separator 15, pump 19, and fractionation tower 13 in FIG. 1) with a single equipment item (processing assembly 113 in FIG. 2). This reduces the plot space requirements, eliminates the interconnecting piping, and eliminates the power consumed by the reflux pump, reducing the capital cost and operating cost of a process plant utilizing the present invention over that of the prior art. Second, elimination of the interconnecting piping means that a processing plant utilizing the present invention has far fewer flanged connections compared to the prior art, reducing the number of potential leak sources in the plant. Hydrocarbons are volatile organic compounds (VOCs), some of which are classified as greenhouse gases and some of which may be precursors to atmospheric ozone formation. Since carbon dioxide is also a greenhouse gas, the present invention significantly reduces the potential for atmospheric releases that can damage the environment.

Other Embodiments

Figure 3:
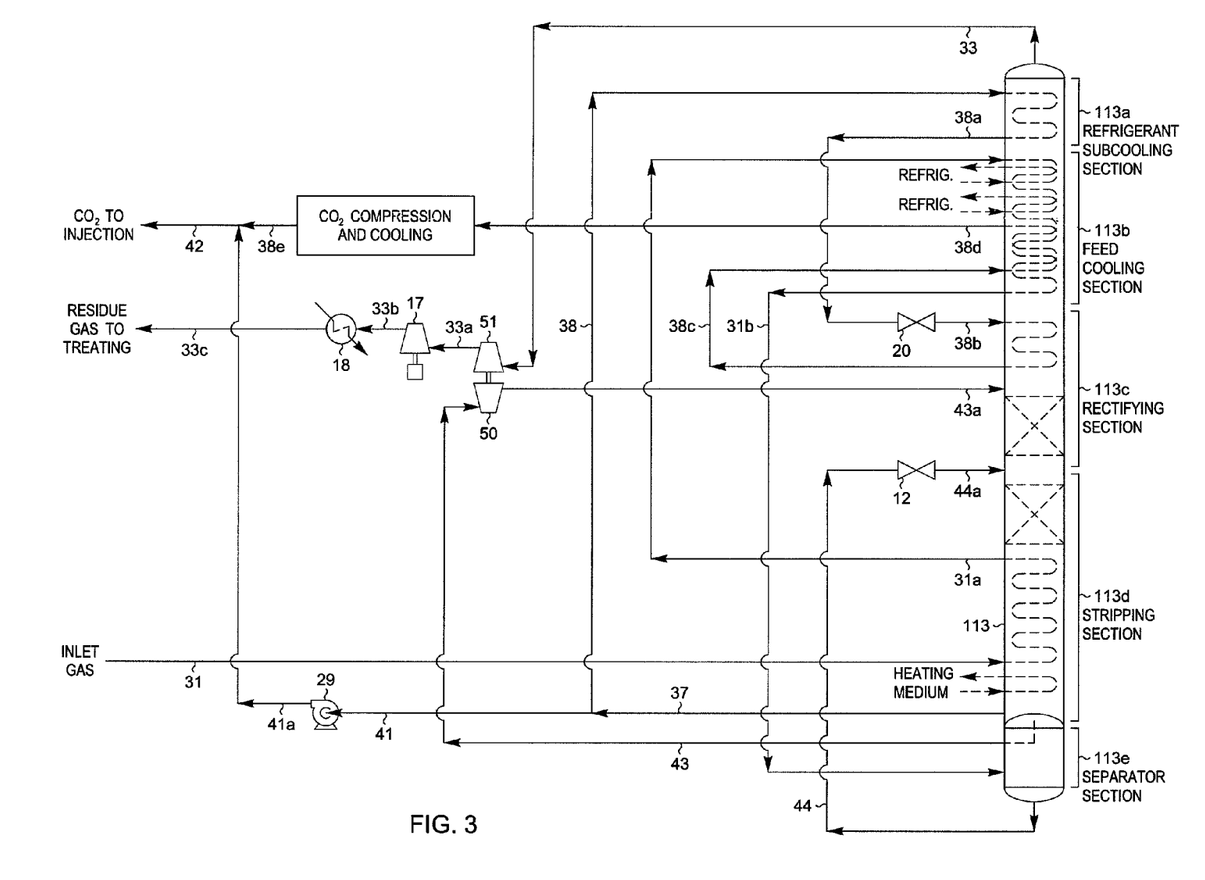
FIGS. 3 and 4 are flow diagrams illustrating alternative means of application of the present invention to a natural gas stream.

As described earlier for the embodiment of the present invention shown in FIG. 2, feed stream 31 is totally condensed as it is cooled in the heat and mass transfer means in stripping section 113d and the heat exchange means in feed cooling section 113b, and the resulting liquid stream 31b is then expanded by expansion valve 12 to the operating pressure of stripping section 113d inside processing assembly 118. However, the present invention is not limited to this embodiment. Depending on the quantity of heavier hydrocarbons in the feed gas and the feed gas pressure, the cooled feed stream 31b expanded by expansion valve 12 in FIG. 2 may not contain any liquid (because it is above its dewpoint, or because it is above its cricondenbar). Some circumstances may favor partial condensation of the feed gas, separating it into its respective vapor and liquid phases, and then expanding the vapor and liquid phases separately. Such an embodiment is shown in FIG. 3, where processing assembly 113 includes separator section 113e to separate the partially condensed feed gas (stream 31b) into vapor stream 43 and liquid stream 44. (Separator section 113e has an internal head or other means to divide it from stripping section 113d, so that the two sections inside processing assembly 113 can operate at different pressures.) The vapor stream 43 enters a work expansion machine 50 in which mechanical energy is extracted from this portion of the high pressure feed as the vapor is expanded substantially isentropically to the operating pressure of rectifying section 113c, whereupon the expanded stream 43a is supplied to processing assembly 113 below the heat and mass transfer means in rectifying section 113c. The work recovered is often used to drive a centrifugal compressor (such as item 51) that can be used to re-compress the residue gas stream (stream 33), for example.

Liquid stream 44 is expanded to the operating pressure of stripping section 113d by expansion valve 12 before the expanded stream 44a is supplied to processing assembly 113 above the mass transfer means in the upper region of stripping section 113d. In some cases, it may be advantageous to include a mass transfer means in rectifying section 113c below the point at which expanded stream 43a enters rectifying section 113c.

Figure 4:
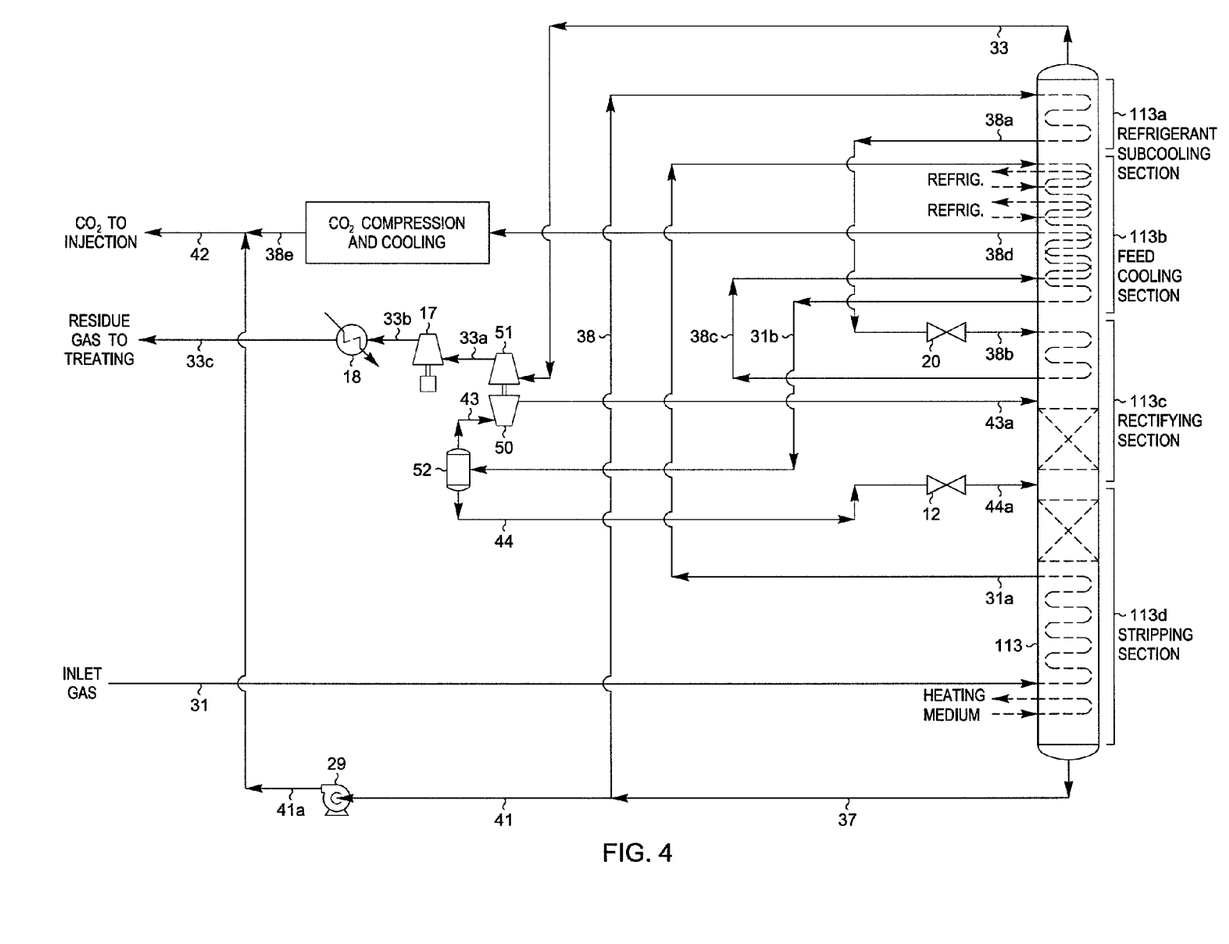

In some circumstances, it may be advantageous to use an external separator vessel to separate cooled feed stream 31b, rather than including separator section 113e in processing assembly 113. As shown in FIG. 4, separator 52 can be used to separate cooled feed stream 31b into vapor stream 43 and liquid stream 44.

Feed gas conditions, plant size, available equipment, or other factors may indicate that elimination of work expansion machine 50, or replacement with an alternate expansion device (such as an expansion valve), is feasible in the FIGS. 3 and 4 embodiments. Although individual stream expansion is depicted in particular expansion devices, alternative expansion means may be employed where appropriate. For example, conditions may warrant work expansion of cooled feed stream 31b in FIG. 2 or liquid stream 44 in FIGS. 3 and 4.

In accordance with the present invention, the use of external refrigeration to supplement the cooling available to the inlet gas from the distillation vapor and liquid streams may be employed. In such cases, the heat exchange means in feed cooling section 113b may include one or more passes for the refrigerant as shown by the dashed lines in FIGS. 2 through 4. Alternatively, conventional gas chiller(s) could be used to cool stream 31a with refrigerant before stream 31a enters the heat exchange means in feed cooling section 113b and/or cool stream 31b with refrigerant before stream 31b enters expansion valve 12 (FIG. 2), separator section 113e (FIG. 3) or separator 52 (FIG. 4).

Depending on the temperature and richness of the feed gas and the amount of methane allowed in liquid product stream 37, there may not be sufficient heating available from feed stream 31 to cause the liquid leaving stripping section 113d to meet the product specifications. In such cases, the heat and mass transfer means in stripping section 113d may include provisions for providing supplemental heating with heating medium as shown by the dashed lines in FIGS. 2 through 4. Alternatively, another heat and mass transfer means can be included in the lower region of stripping section 113d for providing supplemental heating, or stream 31 can be heated with heating medium before it is supplied to the heat and mass transfer means in stripping section 113d.

Depending on the type of heat transfer devices selected for the heat exchange means in refrigerant subcooling section 113a and feed cooling section 113b, it may be possible to combine these heat exchange means in a single multi-pass and/or multi-service heat transfer device. In such cases, the multi-pass and/or multi-service heat transfer device will include appropriate means for distributing, segregating, and collecting stream 31a, stream 38, stream 38c, and stream 33 in order to accomplish the desired cooling and heating. Likewise, the type of heat and mass transfer device selected for the heat and mass transfer means in rectifying section 113c may allow combining it with the heat exchange means in feed cooling section 113b (and possibly with the heat exchange means in refrigerant subcooling section 113a as well) in a single multi-pass and/or multi-service heat and mass transfer device. In such cases, the multi-pass and/or multi-service heat and mass transfer device will include appropriate means for distributing, segregating, and collecting stream 31a, stream 38, stream 38b, stream 38c, and stream 33 in order to accomplish the desired cooling and heating.

In some circumstances, the portion (stream 38) of column bottom product stream 37 that is used to provide refrigeration in FIGS. 2 through 4 may not need to be restored to high pressure after it has been heated (stream 38d). In such cases, the compression and cooling shown (compressors 21, 23, 25, and 27 and discharge coolers 22, 24, 26, and 28) may not be needed, and only stream 41a flows to stream 42.

The present invention provides improved separation of carbon dioxide from hydrocarbon gas streams per amount of utility consumption required to operate the process. An improvement in utility consumption required for operating the process may appear in the form of reduced power requirements for compression or re-compression, reduced power requirements for pumping, reduced power requirements for external refrigeration, reduced energy requirements for supplemental heating, reduced energy requirements for tower reboiling, or a combination thereof.

While there have been described what are believed to be preferred embodiments of the invention, those skilled in the art will recognize that other and further modifications may be made thereto, e.g. to adapt the invention to various conditions, types of feed, or other requirements without departing from the spirit of the present invention as defined by the following claims.

We claim:

1. A process for the separation of a gas stream containing at least methane and carbon dioxide into a volatile residue gas fraction containing a major portion of said methane and a relatively less volatile fraction containing a major portion of said carbon dioxide wherein
   (1) said gas stream is cooled in a first means for providing heat and mass transfer that is housed in a single equipment item processing assembly thereby forming a cooled stream, and further cooled in a lower region of one or more means for providing heat exchange housed in said processing assembly, thereby forming a further cooled stream;
   (2) said further cooled stream is expanded to intermediate pressure whereby it is further cooled;
   (3) said expanded further cooled stream is supplied as a top feed to a mass transfer means housed in said processing assembly, said mass transfer means having a lower region and an upper region;
   (4) a distillation liquid stream is collected from the lower region of said mass transfer means and heated in said first means for providing heat and mass transfer, said first means for providing heat and mass transfer being configured to provide heat exchange between
      (a) said gas stream flowing through one pass of said first means for providing heat and mass transfer; and
      (b) said distillation liquid stream flowing downward from said mass transfer means,
      so that said gas stream is cooled to form said cooled stream while heating said distillation liquid stream before it leaves said first means for providing heat and mass transfer; and wherein as said distillation liquid stream is heated, a portion of it is vaporized to form stripping vapors that rise upward as remaining liquid continues flowing downward through said first means for providing heat and mass transfer; and wherein said first means for providing heat and mass transfer provides continuous contact between said stripping vapors and said remaining liquid so that said first means for providing heat and mass transfer also functions to provide mass transfer between vapor and liquid phases, stripping said remaining liquid of methane and lighter components; and wherein said first means for providing heat and mass transfer supplies at least a portion of the cooling of step (1) while simultaneously stripping the more volatile components from said remaining liquid stream, and thereafter discharging said heated and stripped remaining liquid from said processing assembly as said relatively less volatile fraction; wherein said first means for providing heat and mass transfer does not include external reboilers;
   (5) a first distillation vapor stream is collected from the upper region of said mass transfer means and combined with a vapor portion of said expanded further cooled stream to form a second distillation vapor stream;
   (6) said second distillation vapor stream is cooled in a second means for providing heat and mass transfer that is housed in said processing assembly, thereby condensing the less volatile components from said second distillation vapor stream and forming a condensed stream and a third distillation vapor stream; wherein said second means for providing heat and mass transfer does not include external reflux equipment items;
   (7) at least a portion of said condensed stream is supplied as another top feed to said mass transfer means;
   (8) said relatively less volatile fraction is divided into at least first and second streams;
   (9) said second stream is cooled in an upper region of said one or more heat exchange means and thereafter expanded to lower pressure whereby it is further cooled;
   (10) said expanded cooled second stream is heated, in said second means for providing heat and mass transfer, said second means for providing heat and mass transfer being configured to provide heat exchange between
      (a) said second distillation vapor stream flowing upward through one pass of said second means for providing heat and mass transfer; and
      (b) said expanded cooled second stream flowing downward,
      so that said second distillation vapor stream is cooled while heating said expanded cooled second stream; wherein as said second distillation vapor stream is cooled, a portion of said second distillation vapor stream is condensed and said condensed stream is thereby formed and falls downward while said third distillation vapor stream is also formed and flows upward through said second means for providing heat and mass transfer; wherein said second means for providing heat and mass transfer provides continuous contact between said condensed stream and said third distillation vapor stream so that said second means for providing heat and mass transfer also functions to provide mass transfer between vapor and liquid phases, thereby providing rectification of said third distillation vapor stream; and wherein said second means for providing heat and mass transfer supplies at least a portion of the cooling of step (6);
   (11) said third distillation vapor stream is heated in said lower region of said one or more means for providing heat exchange that is housed in said processing assembly, said one or more means for providing heat exchange being configured to provide heat exchange between (a) said cooled stream flowing through one pass in said lower region of said one or more heat exchange means, (b) said heated expanded cooled second stream flowing through another pass in said lower region of said one or more heat exchange means, and (c) said third distillation vapor stream arising from said second means for providing heat and mass transfer, so that said third distillation vapor stream is heated to form a partially heated third distillation vapor stream and said heated expanded cooled second stream is further heated while said cooled stream is further cooled; and wherein said one or more means for providing heat exchange is further configured to provide heat exchange between (d) said second stream flowing through one pass in said upper region of said one or more heat exchange means, and (e) said partially heated third distillation vapor stream that has been heated in said lower region of said one or more means for providing heat exchange, wherein said second stream is cooled while further heating said partially heated third distillation vapor stream to form a heated third distillation vapor stream and wherein said one or more means for providing heat exchange supplies at least a portion of the cooling of steps (1) and (9), and thereafter discharging said heated third distillation vapor stream from said processing assembly as said volatile residue gas fraction; wherein said one or more heat exchange means does not include external reflux equipment items; and (12) the quantities and temperatures of said feed streams to said mass transfer means are effective to maintain the temperature of said upper region of said mass transfer means at a temperature whereby the major portion of said carbon dioxide is recovered in said relatively less volatile fraction.

2. The process according to claim 1 wherein (1) said gas stream is cooled sufficiently to partially condense it;

(2) said partially condensed gas stream is supplied to a separating means and is separated therein to provide a vapor stream and at least one liquid stream;

(3) said at least one liquid stream is expanded to intermediate pressure;

(4) said expanded liquid stream is supplied as said top feed to said mass transfer means;

(5) said vapor stream is expanded to said intermediate pressure and is supplied as a feed to said processing assembly below said second means for providing heat and mass transfer; and (6) said first distillation vapor stream is collected from the upper region of said mass transfer means and combined with the vapor portion of said expanded vapor stream to form said second distillation vapor stream.

3. The process according to claim 2 wherein said separating means is housed in said processing assembly.

4. The process according to claim 2 or 3 wherein (1) an additional mass transfer means is housed in said processing assembly below said second means for providing heat and mass transfer, said additional mass transfer means having a lower region and an upper region;

(2) said expanded vapor stream is supplied as a top feed to said additional mass transfer means;

(3) said first distillation vapor stream is directed to said additional mass transfer means as a bottom feed thereto;

(4) a fourth distillation vapor stream is collected from the upper region of said additional mass transfer means and combined with said vapor portion of said expanded vapor stream to form said second distillation vapor stream;

(5) at least a portion of said condensed stream is supplied as another top feed to said additional mass transfer means; and (6) the quantities and temperatures of said feed streams to said additional mass transfer means are effective to maintain the temperature of said upper region of said additional mass transfer means at a temperature whereby the major portion of said carbon dioxide is recovered in said relatively less volatile fraction.

5. The process according to claim 1 wherein said first means for providing heat and mass transfer includes one or more passes for an external heating medium to supplement the heating supplied by said gas stream for said stripping of said more volatile components from said remaining liquid stream.

6. The process according to claim 4 wherein said first means for providing heat and mass transfer includes one or more passes for an external heating medium to supplement the heating supplied by said gas stream for said stripping of said more volatile components from said distillation liquid stream.

7. An apparatus for the separation of a gas stream containing at least methane and carbon dioxide into a volatile residue gas fraction containing a major portion of said methane and a relatively less volatile fraction containing a major portion of said carbon dioxide comprising (1) first means for providing heat and mass transfer housed in a single equipment item processing assembly to cool said gas stream;

(2) one or more means for providing heat exchange housed in said processing assembly and connected to said first means for providing heat and mass transfer to receive said cooled gas stream and further cool it, thereby forming a cooled stream;

(3) first expansion means connected to said one or more means for providing heat exchange to receive said cooled stream and expand it to intermediate pressure;

(4) mass transfer means housed in said processing assembly and connected to said first expansion means to receive said expanded cooled stream as a top feed thereto, said mass transfer means having a lower region and an upper region;

(5) liquid collecting means housed in said processing assembly and connected to said mass transfer means to receive a distillation liquid stream from the lower region of said mass transfer means;

(6) said first means for providing heat and mass transfer being further connected to said liquid collecting means to receive said distillation liquid stream and heat it, said first means for providing heat and mass transfer being configured to provide heat exchange between (a) said gas stream flowing through one pass of said first means for providing heat and mass transfer; and (b) said distillation liquid stream flowing downward from said mass transfer means, so that said gas stream is cooled to form said cooled stream while heating said distillation liquid stream before it leaves said first means for providing heat and mass transfer; and wherein as said distillation liquid stream is heated, a portion of it is vaporized to form stripping vapors that rise upward as remaining liquid continues flowing downward through said first means for providing heat and mass transfer; and wherein said first means for providing heat and mass transfer provides continuous contact between said stripping vapors and said remaining liquid so that said first means for providing heat and mass transfer also functions to provide mass transfer between vapor and liquid phases, stripping said remaining liquid of methane and lighter components; and wherein said first means for providing heat and mass transfer supplies at least a portion of the cooling of step (1) while simultaneously stripping the more volatile components from said remaining liquid stream, and thereafter discharging said heated and stripping remaining liquid from said processing assembly as said relatively less volatile fraction; wherein said first means for providing heat and mass transfer does not include external reboilers;

(7) vapor collecting means housed in said processing assembly and connected to said mass transfer means to receive a first distillation vapor stream from the upper region of said mass transfer means;

(8) combining means connected to said vapor collecting means to receive said first distillation vapor stream and combine it with any vapor portion of said expanded cooled stream and form thereby a second distillation vapor stream;

(9) second means for providing heat and mass transfer housed in said processing assembly and connected to said combining means to receive said second distillation vapor stream and cool it, thereby forming a condensed stream and a third distillation vapor stream;

(10) said mass transfer means being further connected to said second means for providing heat and mass transfer to receive at least a portion of said condensed stream as another top feed thereto;

(11) dividing means connected to said processing assembly to receive said relatively less volatile fraction and divide it into at least first and second streams;

(12) said one or more means for providing heat exchange being connected to said dividing means to receive said second stream and cool it;

(13) second expansion means connected to said one or more means for providing heat exchange means to receive said cooled second stream and expand it to lower pressure;

(14) said second means for providing heat and mass transfer being further connected to said second expansion means to receive said expanded cooled second stream and heat it, thereby to supply at least a portion of the cooling of step (9); said second means for providing heat and mass transfer being configured to provide heat exchange between
 (a) said second distillation vapor stream flowing upward through one pass of said second means for providing heat and mass transfer; and
 (b) said expanded cooled second stream flowing downward,
so that said second distillation vapor stream is cooled while heating said expanded cooled second stream; wherein as said second distillation vapor stream is cooled, a portion of said second distillation vapor steam is condensed and said condensed stream is thereby formed and falls downward while said third distillation vapor stream is also formed and flows upward through said second means for providing heat and mass transfer; wherein said second means for providing heat and mass transfer provides continuous contact between said condensed stream and said third distillation vapor stream so that said second means for providing heat and mass transfer also functions to provide mass transfer between vapor and liquid phases, thereby providing rectification of said third distillation vapor stream;

(15) said third distillation vapor stream is heated in a lower region of said one or more means for providing heat exchange that is housed in said processing assembly, said one or more means for providing heat exchange being configured to provide heat exchange between
 (a) said cooled stream flowing through one pass in said lower region of said one or more heat exchange means,
 (b) said heated expanded cooled second stream flowing through another pass in said lower region of said one or more heat exchange means, and
 (c) said third distillation vapor stream arising from said second means for providing heat and mass transfer,
so that said third distillation vapor stream is heated to form a partially heated third distillation vapor stream and said heated expanded cooled second stream is further heated while said cooled stream is further cooled; and wherein said one or more means for providing heat exchange is further configured to provide heat exchange between
 (d) said second stream flowing through one pass in an upper region of said one or more heat exchange means, and
 (e) said partially heated third distillation vapor stream that has been heated in said lower region of said one or more means for providing heat exchange,
wherein said second stream is cooled while further heating said partially heated third distillation vapor stream to form a heated third distillation vapor stream and wherein said one or more means for providing heat exchange supplies at least a portion of the cooling of steps (1) and (12), and thereafter discharging said heated third distillation vapor stream from said processing assembly as said volatile residue gas fraction; wherein said one or more heat exchange means does not include external reflux equipment items; and (16) control means adapted to regulate the quantities and temperatures of said feed streams to said upper region of said mass transfer means to maintain the temperature of said upper region of said mass transfer means at a temperature whereby the major portion of said carbon dioxide is recovered in said relatively less volatile fraction.

8. The apparatus according to claim 7 wherein
(1) said one or more means for providing heat exchange is adapted to receive said cooled gas stream and further cool it, thereby forming a partially condensed gas stream;
(2) a separating means is connected to said one or more means for providing heat exchange to receive said partially condensed gas stream and separate it into a vapor stream and at least one liquid stream;
(3) said first expansion means is connected to said separating means to receive said at least one liquid stream and expand it to intermediate pressure;

(4) said mass transfer means is connected to said first expansion means to receive said expanded liquid stream as said top feed thereto;

(5) a third expansion means is connected to said separating means to receive said vapor stream and expand it to said intermediate pressure, said third expansion means being further connected to said processing assembly to supply said expanded vapor stream as a feed thereto below said second means for providing heat and mass transfer; and (6) said combining means is connected to said vapor collecting means to receive said first distillation vapor stream and combine it with the vapor portion of said expanded vapor stream and form thereby said second distillation vapor stream.

9. The apparatus according to claim 8 wherein said separating means is housed in said processing assembly.

10. The apparatus according to claim 8 or 9 wherein (1) an additional mass transfer means is housed in said processing assembly below said second means for providing heat and mass transfer, said additional mass transfer means having a lower region and an upper region;

(2) said additional mass transfer means is connected to said third expansion means to receive said expanded vapor stream as a top feed thereto;

(3) said additional mass transfer means is further connected to said vapor collecting means to receive said first distillation vapor stream as a bottom feed thereto;

(4) an additional vapor collecting means is housed in said processing assembly and connected to said additional mass transfer means to receive a fourth distillation vapor stream from the upper region of said additional mass transfer means;

(5) said combining means is adapted to be connected to said additional vapor collecting means to receive said fourth distillation vapor stream and combine it with said vapor portion of said expanded vapor stream, thereby forming said second distillation vapor stream;

(6) said additional mass transfer means is further connected to said second means for providing heat and mass transfer to receive at least a portion of said condensed stream as another top feed thereto; and (7) said control means is adapted to regulate the quantities and temperatures of said feed streams to said upper region of said additional mass transfer means to maintain the temperature of said upper region of said additional mass transfer means at a temperature whereby the major portion of said carbon dioxide is recovered in said relatively less volatile fraction.

11. The apparatus according to claim 7, 8, or 9 wherein said first means for providing heat and mass transfer includes one or more passes for an external heating medium to supplement the heating supplied by said gas stream for said stripping of said more volatile components from said distillation liquid stream.

12. The apparatus according to claim 10 wherein said first means for providing heat and mass transfer includes one or more passes for an external heating medium to supplement the heating supplied by said gas stream for said stripping of said more volatile components from said distillation liquid stream.

\* \* \* \* \*

UNITED STATES PATENT AND TRADEMARK OFFICE
CERTIFICATE OF CORRECTION

PATENT NO. : 9,939,196 B2
APPLICATION NO. : 12/792136
DATED : April 10, 2018
INVENTOR(S) : Andrew F. Johnke et al.

It is certified that error appears in the above-identified patent and that said Letters Patent is hereby corrected as shown below:

Column 15:
Line 17, "stripping" should read --stripped--; and
Line 65, "steam" should read --stream--.

Signed and Sealed this
Tenth Day of July, 2018

Andrei Iancu
*Director of the United States Patent and Trademark Office*